(12) United States Patent
Baumann et al.

(10) Patent No.: US 10,631,046 B2
(45) Date of Patent: Apr. 21, 2020

(54) METHOD AND DEVICE FOR ADAPTING THE DISPLAY OF A VIDEO STREAM BY A CLIENT

(71) Applicant: Orange, Paris (FR)

(72) Inventors: Maximilien Baumann, Cesson Sevigne (FR); Sandrine Lacharme, Geveze (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 15/515,540

(22) PCT Filed: Sep. 28, 2015

(86) PCT No.: PCT/FR2015/052574
§ 371 (c)(1),
(2) Date: Mar. 29, 2017

(87) PCT Pub. No.: WO2016/051055
PCT Pub. Date: Apr. 7, 2016

(65) Prior Publication Data
US 2017/0223409 A1 Aug. 3, 2017

(30) Foreign Application Priority Data

Sep. 30, 2014 (FR) ...................................... 1459248

(51) Int. Cl.
*H04N 21/44* (2011.01)
*H04N 21/435* (2011.01)
*H04N 21/4402* (2011.01)
*H04N 21/462* (2011.01)
*H04L 29/06* (2006.01)
(Continued)

(52) U.S. Cl.
CPC ..... *H04N 21/4402* (2013.01); *H04L 65/4092* (2013.01); *H04L 65/80* (2013.01); *H04L 67/04* (2013.01); *H04L 67/303* (2013.01); *H04N 21/2343* (2013.01); *H04N 21/4314* (2013.01); *H04N 21/4355* (2013.01);
(Continued)

(58) Field of Classification Search
CPC .................................................. H04N 21/4402
USPC ........................................................ 348/445
See application file for complete search history.

(56) References Cited

U.S. PATENT DOCUMENTS 8,813,156 B1 * 8/2014 Huang ...................... G06T 1/20
725/116
2006/0239345 A1* 10/2006 Taubman ............... H04N 19/52
375/240.03
(Continued)

OTHER PUBLICATIONS

International Search Report and Written Opinion dated Jan. 20, 2016 for Application No. PCT/FR2015/052574.
(Continued)

*Primary Examiner* — Jefferey F Harold
*Assistant Examiner* — Justin B Sanders
(74) *Attorney, Agent, or Firm* — Knobbe, Martens, Olson & Bear, LLP

(57) ABSTRACT

A method for adapting the display of a video stream by a client includes a modification of a video tag of the client. The modified video tag is a function of a resolution of equipment supplying the video stream, of a size of a display window for the video stream, and of an accuracy parameter. The modified video tag has the same relation as the resolution to the size of the display window in which the video stream is displayed by the client.

16 Claims, 2 Drawing Sheets

(51) Int. Cl.
*H04L 29/08* (2006.01)
*H04N 21/431* (2011.01)
*H04N 21/8543* (2011.01)
*H04N 21/2343* (2011.01)
*H04N 21/6377* (2011.01)

(52) U.S. Cl.
CPC ..... *H04N 21/4621* (2013.01); *H04N 21/6377* (2013.01); *H04N 21/8543* (2013.01); *H04L 29/08* (2013.01)

(56) References Cited

U.S. PATENT DOCUMENTS

| | | | | |
|---|---|---|---|---|
| 2007/0024705 | A1* | 2/2007 | Richter | H04N 7/17318 348/142 |
| 2009/0259766 | A1* | 10/2009 | Karlsson | H04N 21/234309 709/231 |
| 2011/0161843 | A1* | 6/2011 | Bennett | G06F 3/14 715/760 |
| 2012/0102184 | A1 | 4/2012 | Candelore | |
| 2013/0195204 | A1 | 8/2013 | Reznik et al. | |

OTHER PUBLICATIONS

International Preliminary Report on Patentability dated Sep. 9, 2016 for Application No. PCT/FR2015/052574.

\* cited by examiner

METHOD AND DEVICE FOR ADAPTING THE DISPLAY OF A VIDEO STREAM BY A CLIENT

RELATED APPLICATIONS

This application is the U.S. National Phase of Application No. PCT/FR2015/052574 entitled "METHOD AND DEVICE FOR ADAPTING THE DISPLAY OF A VIDEO STREAM BY A CLIENT" filed Sep. 28, 2015, which designated the United States, and which claims the benefit of French Application No. 1459248 filed Sep. 30, 2014.

The invention relates to a method for adapting the display of a video stream by a client, particularly a client such as an HTML 5.0 browser, and/or one using a WebRTC communication protocol for receiving the video stream.

The display of a video stream by a client is usually fixed in a predetermined manner in the client, by means of a video tag. Depending on the resolution of the supplying equipment, the video carried by the video stream may be displayed in a deformed manner, or partially, or illegibly for the user of a terminal using the client, or may even be impossible to display.

This is because, if the video tag is equal to the resolution of the equipment supplying the video stream, either the display of the video will occupy a very small part of the client's window if the size of the terminal screen is large relative to this resolution, or the display of part of the video will be cropped if the size of the terminal screen is small relative to this resolution.

Furthermore, if the video tag is equal to the size of the client's window on which the video is displayed, the video may be deformed, and/or stretched and/or blurred because of the high ratio between the resolution of the equipment supplying the video stream and the size of the display window.

In the case of the display of a video loaded before display, resizing software has been proposed, for resizing the video to the size of the client's window in which it is displayed, so that the video occupies the whole of the client's window, in one dimension at least, without being deformed. This resizing processing requires processing time, and the whole of the video must be processed before being displayed.

One of the aims of the present invention is to overcome some drawbacks of the prior art.

One object of the invention is a method for adapting the display of a video stream by a client. The adaptation method comprises a modification of a video tag of the client. The modified video tag is a function of a resolution of equipment supplying the video stream, of a size of a display window for the video stream, and of an accuracy parameter. The modified video tag has the same relation as the resolution to the size of the display window in which the video stream is displayed by the client.

Thus the display of a real-time video stream may be resized while retaining the real-time character, without deformation and without loss of quality in the display of the video carried by the video stream. The accuracy parameter may be used, notably, to retain the ratio of the original video, i.e. 4:3, 16:9, or the like.

Advantageously, the adaptation method comprises, after the reception of at least the resolution of the equipment supplying the video stream, the processing of said resolution as a function of the accuracy parameter, the resolution resulting from the processing being used in the step of video tag modification.

Thus, the only delay caused by the adaptation is that which is due to the processing and the modification of a video tag using the result of the processing, these operations being performed once only for the whole video stream, after the reception of the resolution with the start of the video stream.

Advantageously, the modification is performed if at least one of the dimensions of the size of the client's display window is smaller than one of the dimensions of the resolution.

Thus, if the size of the display window is smaller than the resolution, the real-time display of the video carried by the real-time stream is reduced so as not to exceed the size of the client's display window.

Advantageously, if at least one of the dimensions of the size of the client's display window is smaller than one of the dimensions of the resolution, the modified video tag is proportional to the resolution, the proportion factor, which is a function of the accuracy parameter, being less than 1.

Advantageously, if at least one of the dimensions of the size of the client's display window is smaller than one of the dimensions of the resolution, each dimension of the modified video tag is equal to the corresponding dimension of the resolution multiplied by the accuracy parameter from which 1 has been subtracted, and divided by the accuracy parameter.

Thus the quality of the video carried by the video stream is better maintained during the display of this video in a display window whose size is smaller than the resolution.

Advantageously, the modification is performed if at least one of the dimensions of the size of the client's display window is greater than one of the dimensions of the resolution.

Thus, if the size of the display window is smaller than the resolution, the real-time display of the video carried by the real-time stream is increased at the start of the reading of the displayed video stream (and without any effect on this reading) so as to obtain the maximum benefit from the size of the client's display window.

Advantageously, if at least one of the dimensions of the size of the client's display window is greater than one of the dimensions of the resolution, the modified video tag is proportional to the resolution, the proportion factor, which is a function of the accuracy parameter, being greater than 1.

Advantageously, if at least one of the dimensions of the size of the client's display window is greater than one of the dimensions of the resolution, each dimension of the modified video tag is equal to the corresponding dimension of the resolution multiplied by the accuracy parameter to which 1 has been added, and divided by the accuracy parameter.

Thus the quality of the video carried by the video stream is better maintained during the display of this video in a display window whose size is greater than the resolution.

Advantageously, the size of the display window is equal to the size supplied by the client, from which the size of the client's menu and/or the size of the menu of the service supplying the video stream has been subtracted.

Thus the video display obtains the maximum benefit from the client's window while retaining useful interaction means, since it covers, if necessary, areas of the display window not reserved for the client's menu and/or for the menu of the service which are useful during the display of the video.

Furthermore, if the size of the display window is smaller than the resolution, the display of the video thus approximates more closely to the resolution of the equipment supplying the video stream.

Advantageously, the accuracy parameter is a predefined parameter.

Thus the accuracy parameter may be set to a given value such as a value, usually, within the range from 90 to 1000; in particular, the accuracy parameter may be set to 100, regardless of whether the resolution is 720 pixels or 1080 pixels.

Advantageously, the accuracy parameter is a function of the quality of the video stream.

Thus the accuracy parameter may develop with the increasing quality of the equipment. This will make it possible for the accuracy parameter to adapt as well, notably to the new 4K equipment.

Advantageously, according to an implementation of the invention, the various steps of the method according to the invention are executed by a computer program or software, this software comprising software instructions intended for execution by a data processor of a display device, and designed to command the execution of the various steps of this method.

Consequently the invention also proposes a program comprising program code instructions for executing the steps of the adaptation method when said program is executed by a processor.

This program may use any programming language, and may be in the form of source code, object code, or a code intermediate between source code and object code, such as a code in partially compiled form, or any other desirable form.

Another object of the invention is a method for the display of a video stream by a client. The display method comprises an adaptation of a display of the video stream. The adaptation performs a modification of a video tag of the client, the modified video tag being a function of a resolution of equipment supplying the video stream, of a size of a display window for the video stream, and of an accuracy parameter, the modified video tag having the same relation as the resolution to the size of the display window in which the video stream is displayed by the client.

Another object of the invention is a device for displaying a video stream in a client's window. The display device comprises an adapter of the display of the video stream. The adapter modifies a video tag of the client, the modified video tag being a function of a resolution of equipment supplying the video stream, of a size of a display window for the video stream, and of an accuracy parameter, the modified video tag having the same relation as the resolution to the size of the display window in which the video stream is displayed by the client.

Another object of the invention is a client capable of displaying video streams. The client comprises an adapter of the display of the video stream. The adapter modifies a video tag of the client, the modified video tag being a function of a resolution of equipment supplying the video stream, of a size of a display window for the video stream, and of an accuracy parameter, the modified video tag having the same relation as the resolution to the size of the display window in which the video stream is displayed by the client.

The characteristics and advantages of the invention will be more clearly apparent from a perusal of the following description, provided by way of example, and of the appended drawings, of which:

Figure 1:
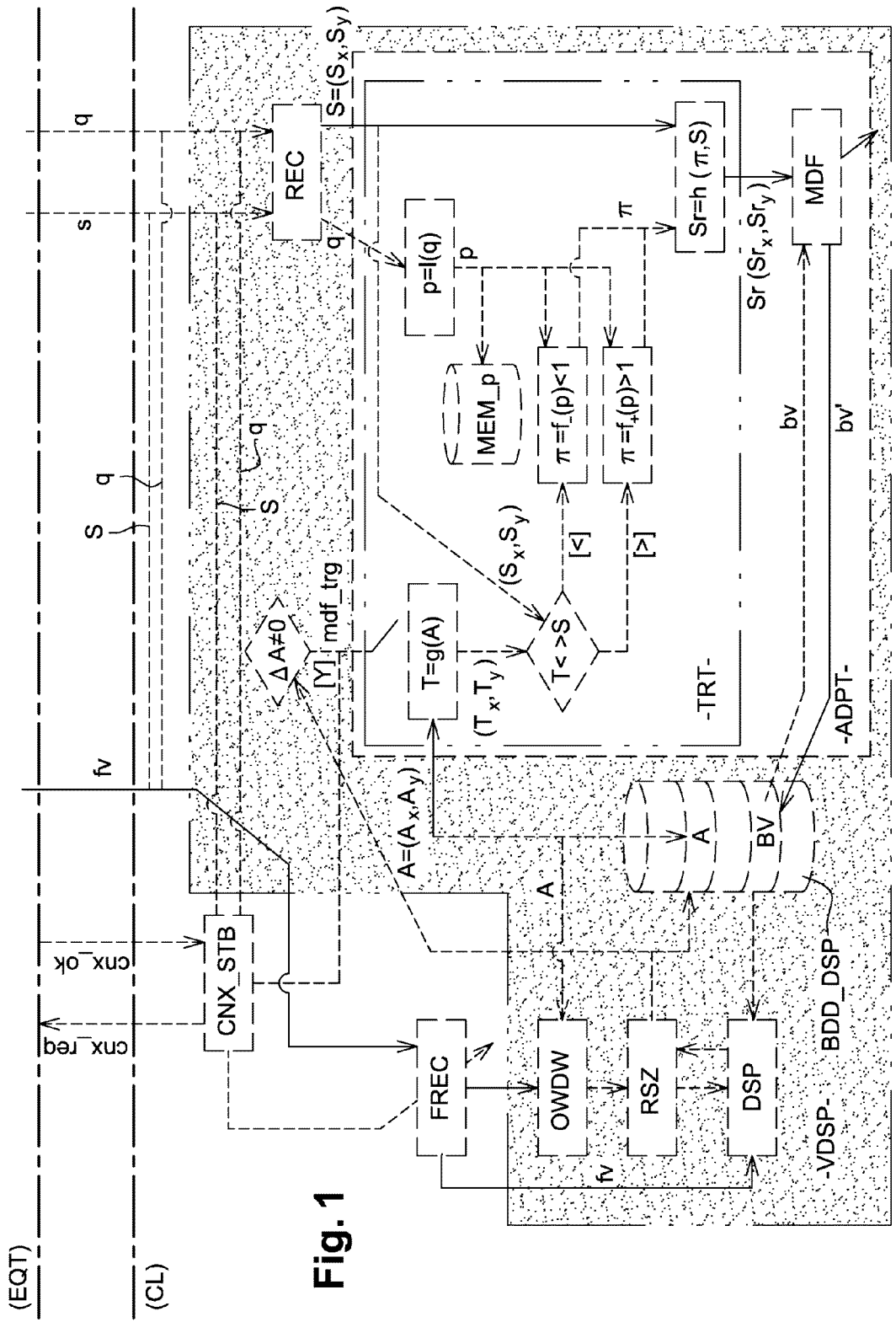
FIG. 1 shows a simplified diagram of a method for adapting the display of a video stream by a client according to the invention.

The method for adapting ADPT the display of a video stream fv by a client CL comprises a modification MDF of a video tag BV of the client CL. The modified video tag bv' is a function of a resolution S of equipment EQT supplying the video stream fv, of a size T of a display window for the video stream, and of an accuracy parameter p. The modified video tag bv' has the same relation as the resolution S to the size T of the display window in which the video stream is displayed by the client.

In the case of a two-dimensional display, the resolution of the equipment is in two dimensions: S=(Sx,Sy), as is the size of the display window: T=(Tx,Ty).

In particular, the adaptation method comprises, after the reception REC of at least the resolution S of the equipment EQT supplying the video stream fv, the processing TRT of said resolution S as a function of the accuracy parameter p, the resolution resulting from the processing Sr being used in the step of video tag modification MDF.

In particular, the modified video tag bv' is proportional to the resolution S: bv'=($\pi$ Sx, $\pi$ Sy), where $\pi$ is a proportion factor which is a function of the accuracy parameter p: $\pi$=f(p).

Notably, the resulting resolution Sr which is used to modify MDF the video tag is proportional to the resolution S: Sr'=h($\pi$, S), where $\pi$ is a proportion factor which is a function of the accuracy parameter p: $\pi$=f(p), enabling the ratio of the resolution of the equipment to be retained.

In particular, the modification MDF is performed if at least one of the dimensions of the size of the client's display window is smaller than one of the dimensions of the resolution (T< >S=[<]). For example, if Tx<Sx or Ty<Sy, then the modification MDF is performed.

Notably, the adaptation method comprises a verification of the relation of the resolution to the size, T< >S. If the relation is [<], the size T is smaller than the resolution S, particularly in at least one of their dimensions, and the verification T< >S launches the modification MDF of the video tag.

In the case of a "smaller" relation [<], the proportion factor $\pi$ is, for example, less than 1.

In particular, in the case of a "smaller" relation [<], each dimension of the modified video tag (bv'x,bv'y) is equal to the corresponding dimension of the resolution (Sx, Sy) multiplied by the accuracy parameter from which 1 has been subtracted (p−1), and divided by the accuracy parameter p:

if Tx<Sx or Ty<Sy, then bv'x=(p−1)Sx/p and bv'y=(p−1)Sy/p, i.e. bv'x=$\pi$ Sx and bv'y=$\pi$ Sy, where $\pi$=f(p)=(p−1)/p In particular, the modification MDF is performed if at least one of the dimensions of the size of the client's display window is greater than one of the dimensions of the resolution (T< >S=[>]). For example, if Tx>Sx or Ty>Sy, then the modification MDF is performed.

Notably, the adaptation method comprises a verification of the relation of the resolution to the size, T< >S. If the relation is [>], the size T is greater than the resolution S, particularly in at least one of their dimensions, and the verification T< >S launches the modification MDF of the video tag.

In this case of a "greater" relation [>], the proportion factor $\pi$ is, for example, greater than 1.

In particular, in the case of a "greater" relation [>], each dimension of the modified video tag (bv'x,bv'y) is equal to the corresponding dimension of the resolution (Sx, Sy) multiplied by the accuracy parameter to which 1 has been added (p+1), and divided by the accuracy parameter p:

if Tx>Sx or Ty>Sy, then bv'x=(p+1)Sx/p and bv'y=(p+1)Sy/p i.e. bv'x=π Sx and bv'y=π Sy, where $\pi = f_+(p) = (p+1)/p$ In particular, the accuracy parameter is a predefined parameter, for example in a range from 95 to 1000. Notably, the accuracy parameter may be set to 100, regardless of the equipment EQT supplying a video stream with a quality VGA of about 720 pixels, but also of about 1080p, or alternatively for less common qualities such as 4:3.

The optimization of the display in terms of size, deformation and display quality appears to be achieved when the accuracy parameter p is set to a value of about 100. To increase the display quality, the accuracy parameter p is set to a higher value, notably 1000.

Notably, the predefined accuracy parameter p is read from a memory MEM_p.

In particular, the accuracy parameter p is a function of the quality q of the video stream fv: p=I(q). Thus the modification MDF is also a function of the quality q of the video stream fv. Thus the modification will vary as a function of the quality of the equipment EQT supplying the video stream fv: For example, for a first piece of equipment EQT1 having a VGA quality of 720p, the accuracy parameter p will take a value of 100, and for a second piece of equipment EQT2 having a quality of 4 K, the accuracy parameter p will automatically change to another value, for example 4000.

One embodiment of the adaptation method ADPT is a program comprising program code instructions for executing the steps of the adaptation method when said program is executed by a processor.

That is to say, the adaptation method ADAPT ADPT is integrated into a display method VDSP: The method VDSP for the display of a video stream fv by a client CL then comprises an adaptation ADPT of a display of the video stream. The adaptation ADPT performs a modification MDF of a video tag by of the client CL. The modified video tag bv' is a function of a resolution S of equipment EQT supplying the video stream fv, of a size T of a display window for the video stream, and of an accuracy parameter p. The modified video tag bv' has the same relation as the resolution S to the size S of the display window in which the video stream is displayed by the client.

That is to say, the adaptation method ADPT exchanges data with the display method VSDP (example not shown), the display method supplying the size T of the display window and the adaptation method supplying the modified video tag bv' either directly or indirectly, for example by writing to a display database BDD_A comprising the size A of the client's window of which the size T of the display window, the video tag BV, etc. is a function.

In particular, the display method comprises an opening of the display window OWDW in which the video stream fv received by the client CL will be displayed. Notably, the opening of the window reads the size of the client's window A, that is to say A=(Ax,Ay) for a two-dimensional display, in a display database BDD_A.

In particular, the display method comprises a display DSP of the video carried by the video stream fv received by the client CL as a function of the video tag, notably the video tag BV read in a display database BDD_A or directly supplied bv' by the adaptation method ADPT.

In particular, the display method comprises a modification of the size of the display window RSZ before or during the display DSP. The new size A of the client's window and/or the new size M of the client's menu and/or the new size W of the menu of the service provided by the equipment EQT supplying the video stream fv are either supplied directly to the adaptation method ADPT or are written to a display database BDD_A.

In particular, a detection of a change of size ΔA≠0 ? triggers mdf_trg either the adaptation ADPT in general, or, more particularly, the modification MDF. If it is the modification MDF that is triggered, the modification MDF comprises the processing TRT (not shown) or triggers this processing TRT.

For example, the detection of a change of size ΔA≠0 ? is integrated into either the adaptation ADPT (not shown) or the display method VSDP. Notably, the detection of a change of size ΔA≠0 ? comprises the monitoring of the display window and/or the modification of the size RSZ and/or of the size A written to the display database BDD_A.

In particular, the size of the display window T used for the adaptation ADPT is a function of the size of the client's window A: T=g(A). Notably, if some menus are useful during a video display, provision may be made for the display to take place not in the whole of the client's window but in only a part of this window, leaving room for the display of one or more menus such as the client's menu and/or the menu of the video streaming service. In this case, the size T of the display window corresponds to the size of the client's window A, minus the size of the client's menu M and/or the size of the service menu W; that is to say, for a two-dimensional display: Tx=Ax−Mx−Wx and Ty=Ay−My−Wy.

One embodiment of the display method VDSP is a program comprising program code instructions for executing the steps of the display method when said program is executed by a processor.

In particular, a method for a client of a video streaming service comprises the establishment CNX_STB of a connection between the client CL and equipment EQT supplying video streams, or possibly supplying the video streaming service. For example, the establishment of a connection CNX_STB performed by the client CL sends a connection request cnx_req to the equipment EQT triggering the connection.

Notably, the connection is not triggered until the establishment of the connection CNX_STB has received a connection agreement cnx_ok or an acknowledgement of the connection request (not shown) from the equipment EQT.

The connection, or more particularly the establishment of the connection CNX_STB, simultaneously triggers mdf_trg the execution of the adaptation method ADPT and/or the modification MDF of the video tag. If it is the modification MDF that is triggered, the modification MDF comprises the processing TRT (not shown) or triggers this processing TRT.

The resolution S and/or the quality q of the equipment EQT is received REC either by the client's method or within the adaptation method ADPT. In particular, the establishment of the connection CNX_STB retrieves the resolution S and/or the quality q from the equipment EQT, and supplies them to the adaptation method ADPT.

When the connection has been established CNX_STB, the client's method comprises the reception of a video stream FREC, which triggers the display method VDSP for displaying the received video stream fv.

Figure 2:
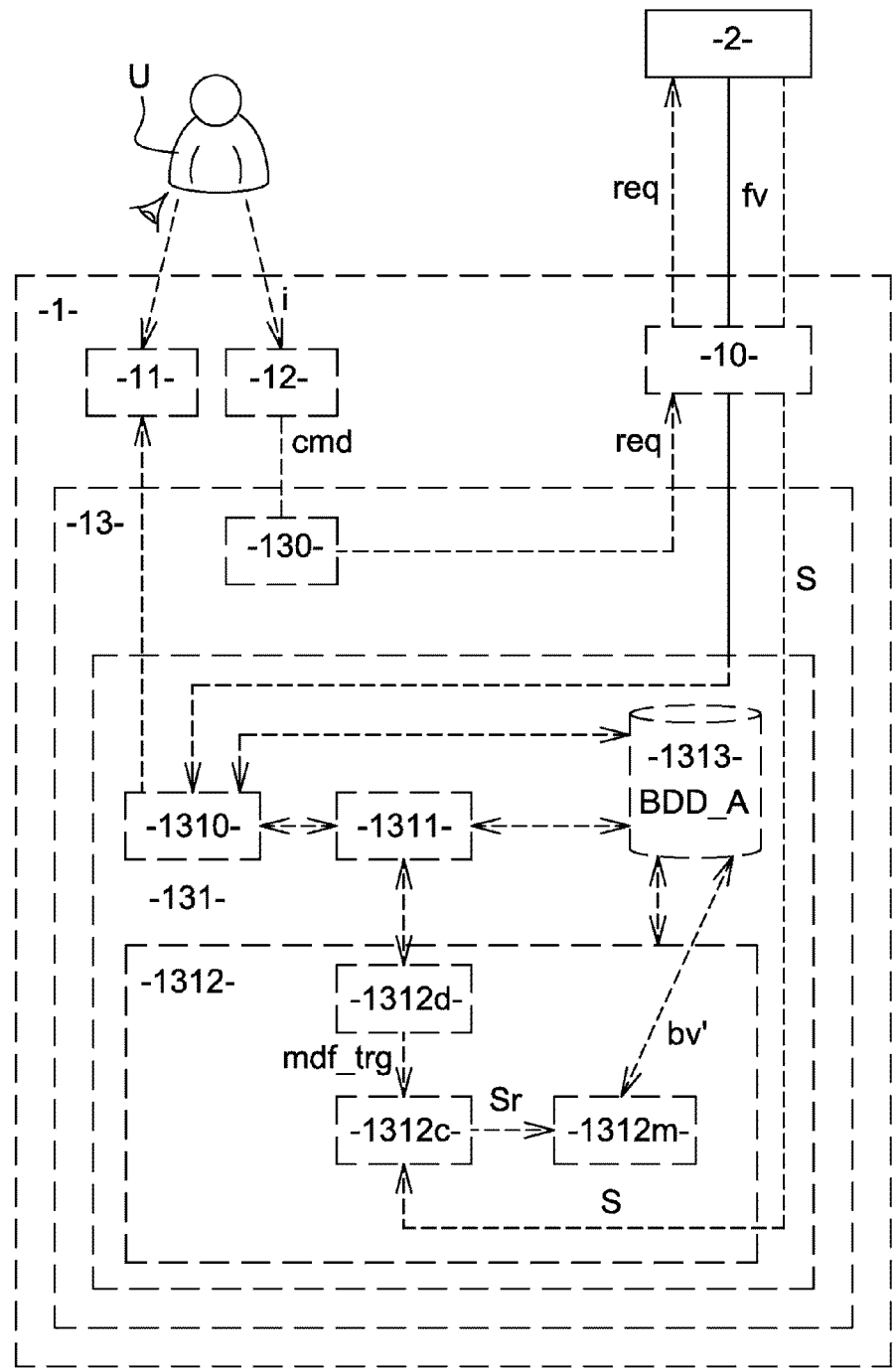
FIG. 2 shows a simplified diagram of a terminal comprising a device for the display of a video stream by a client according to the invention.

FIG. 2 shows a simplified diagram of a terminal 1 comprising a device 131 for the display of a video stream fv by a client device 13 according to the invention.

The device 131 for displaying a video stream fv in a window of the client's device 13 comprises an adapter 1312 of the display of the video stream. The adapter 1312 modifies a video tag of the client. The modified video tag is a function of a resolution of equipment 2 supplying the video stream (such as a video streaming server), of a size of a display window for the video stream, and of an accuracy parameter. The modified video tag has the same relation as the resolution to the size of the display window in which the video stream is displayed by the client.

In particular, the adapter 1312 comprises a module 1312m for modifying the video tag as a function of the resolution of equipment 2 supplying the video stream (such as a video streaming server), of a size of a display window for the video stream, and of an accuracy parameter. The modification module 1312m supplies the modified video tag bv' to the display device 131 directly (not shown) or indirectly, notably by writing it to a display database 1313.

In particular, the adapter 1312 comprises a processing module 1312c which may be integrated (not shown) into the modification module 1312m, or may not be integrated thereinto. The processing module 1312c receives or retrieves the resolution S of the equipment 2, directly or indirectly from the equipment 2, notably by means of the transmitter/receiver 10 of a terminal 1 comprising the client device 13. The processing module 1312c calculates a resultant resolution Sr which is a function of the resolution S of the equipment 2, of an accuracy parameter p and of the size of the display window T. The processing module 1312c supplies the resultant resolution Sr to the modification module 1312m.

In particular, the adapter 1312 comprises a monitoring module 1312d which monitors the display window, in particular the size of the display window. The monitoring module 1312d directly or indirectly triggers the modification module 1312m during a modification of the monitoring window. The monitoring module 1312d may trigger the calculation module 1312c, which triggers the modification module by supplying the resultant resolution Sr. Alternatively, the monitoring module 1312d may trigger the processing module 1312m, which triggers the processing module 1312m if appropriate. There are also other possibilities.

In particular, the display device 131 comprises a display module 1310 which receives the video stream fv and displays the video carried by this video stream in the client's display window as a function of at least one video tag by read, notably, from a display database 1313. Thus, if the video tag written to the database 1313 is the modified video tag written by the adapter 1312, the video display is optimized in terms of size, deformation and quality.

In particular, the display device 131 comprises a client window management module 1311. The display module 1310 and window management module 1311 exchange data in such a way that the video carried by the stream is displayed in the area of the window dedicated to the video display. Notably, the window management device 1311 reads and/or writes the size of the client window A and/or the size of the client menu M and/or the size of the service menu W from or to the database 1313.

In particular, a client 13 suitable for displaying video streams fv comprises the adapter 1312 of the video stream display. Notably, the client 13 comprises the display device 131 comprising the adapter 1312.

In particular, the client 13 comprises a request module 130, which receives commands cmd from the interaction of a user U with a terminal 1, and sends requests req to at least one video streaming device 2, such as a video streaming server. The requests req are, notably, requests for connection to the video streaming device 2, and/or requests for video stream catalogs and/or requests for video streams, or the like. These requests are, notably, transmitted by means of the transmitter/receiver 10 of the terminal 1.

The requests req are, notably, requests for modification of the size of the client window A by the user U, which are transmitted to the window management module 1311. In particular, the monitoring module 1312d of the adapter 1312 exchanges data with and/or monitors the window management module 1311 of the display device.

In particular, a user U has a terminal U for accessing videos offered by a remote server 2, also called the video streaming service supply device. The terminal 1 is a communication terminal comprising a transmitter/receiver 10 which enables the terminal 1 to exchange data, notably, with the video streaming service supply device 2.

In particular, the terminal 1 comprises a display device, such as a screen, 11 and a user interface 12, such as the screen when the latter is a touch screen, or a keyboard, a mouse, a camera, a microphone, or the like.

The user U interacts with the user interface 12, notably, for commanding cmd the connection of the client device 13, notably a device integrated into the terminal 1, with the video streaming service supply device 2, followed by the distribution of a video stream if appropriate.

The video carried by the video stream transmitted by the video streaming service supply device 2 will be displayed on the screen 2 for the user U in an optimal manner in terms of size, deformation and display quality, since the screen 2 is controlled by the display device 131 which comprises an adapter 1312 according to the invention.

The invention also proposes a data medium. The data medium may be any entity or device capable of storing the program. For example, the medium may comprise a storage means such as a ROM, for example a CD-ROM or a microelectronic circuit ROM, or a magnetic recording means such as a diskette or a hard disk.

On the other hand, the data medium may be a transmissible medium such as an electrical or optical signal which may be routed via an electrical or optical cable, by radio or by other means. The program according to the invention may, in particular, be downloaded from a network, notably a network of the Internet type.

Alternatively, the data medium may be an integrated circuit in which the program is incorporated, the circuit being adapted to execute the method in question or to be used in its execution.

In another embodiment, the invention is applied by means of software and/or hardware components. In this context, the term "module" may equally well refer to a software component or a hardware component. A software component is one or more computer programs, one or more sub-programs of a program, or more generally any element of a program or a software package capable of performing a function or a set of functions according to the description above. A hardware component is any element of a hardware assembly capable of performing a function or a set of functions.

The invention claimed is:

1. A method for adapting the display of a video stream by a browser client during the display of video content received from video streaming equipment by the browser client as the video stream at a supplied resolution, the adaptation method comprising:

modifying a video element of the browser client, the video element configured to control the display of the video stream by the browser client in a display window of the browser client, the modified video element being a function of:

the supplied resolution of the video stream, a size of the display window of the browser client in which the video stream is displayed, and an accuracy parameter, the modified video element having the same relation as the resolution to the size of the display window in which the video stream is displayed by the browser client.

2. The method of claim 1, wherein the adaptation method further comprises, after reception of at least the supplied resolution of video stream, processing of the supplied resolution as a function of the accuracy parameter, a modified resolution resulting from the processing being used in the step of modifying the video element.

3. The method of claim 2, wherein modifying the video element is performed if at least one of the dimensions of the display window in which the video stream is displayed by the browser client is smaller than one of the dimensions of the supplied resolution.

4. The method of claim 3, wherein the modified video element is proportional to the supplied resolution, and wherein the proportion factor is a function of the accuracy parameter and is less than 1.

5. The method of claim 3, wherein each dimension of the modified video element is equal to the corresponding dimension of the supplied resolution multiplied by the accuracy parameter from which 1 has been subtracted, and divided by the accuracy parameter.

6. The method of claim 1, wherein modifying the video element is performed if at least one of the dimensions of the display window in which the video stream is displayed by the browser client is greater than one of the dimensions of the supplied resolution.

7. The method of claim 3, wherein the modified video element is proportional to the supplied resolution, and wherein the proportion factor is a function of the accuracy parameter and is greater than 1.

8. The method of claim 6, wherein each dimension of the modified video element is equal to the corresponding dimension of the supplied resolution multiplied by the accuracy parameter to which 1 has been added, and divided by the accuracy parameter.

9. The method of claim 1, wherein the size of the display window is equal to the size supplied by the browser client, from which the size of the menu of the browser client and/or the size of the menu of the service supplying the video stream has been subtracted.

10. The method of claim 1, wherein the accuracy parameter is a predefined parameter.

11. The method of claim 1, wherein the accuracy parameter is a function of the quality of the video stream.

12. A non-transitory computer readable data medium containing instructions for executing an adaptation method when said program is executed by a processor, the method comprising:

modifying a video element of a browser client during the display of video content received by the browser client from video streaming equipment as a video stream at a supplied resolution, the video element configured to control the display of the video stream by the browser client in a display window of the browser client, the modified video element being a function of:

the supplied resolution of the video stream, a size of the display window of the browser client in which the video stream is displayed, and an accuracy parameter, the modified video element having the same relation as the resolution to the size of the display window in which the video stream is displayed by the browser client.

13. A method for the display of a video stream by a browser client during the display of video content received by the browser client from video streaming equipment as the video stream at a supplied resolution, the display method comprising:

adapting a display of the video stream, adapting a display of the video stream comprising modifying a video element of the browser client, the video element configured to control the display of the video stream by the browser client in a display window of the browser client, the modified video element being a function of:

the supplied resolution of the video stream, a size of the display window of the browser client in which the video stream is displayed, and an accuracy parameter, the modified video element having the same relation as the resolution to the size of the display window in which the video stream is displayed by the browser client.

14. A device configured to display a video stream in a window of a browser client, the video stream received from video streaming equipment at a supplied resolution, the device comprising:

an adapter of the display of the video stream, the adapter configured to modify a video element of the browser client, the video element configured to control the display of the video stream by the browser client in a display window of the browser client, the modified video element being a function of:

the supplied resolution of the video stream, a size of the display window of the browser client in which the video stream is displayed, and an accuracy parameter, the modified video element having the same relation as the resolution to the size of the display window in which the video stream is displayed by the browser client.

15. A browser client configured to display a video stream, the video stream received from video streaming equipment by the browser client at a supplied resolution, the browser client comprising:

an adapter of the display of the video stream, the adapter configured to modify a video element of the browser client, the video element configured to control the display of the video stream by the browser client in a display window of the browser client, the modified video element being a function of:

the supplied resolution of the video stream, a size of the display window of the browser client in which the video stream is displayed, and an accuracy parameter, the modified video element having the same relation as the resolution to the size of the display window in which the video stream is displayed by the browser client.

16. The method of claim 1, wherein the video stream comprises a real-time video stream, and wherein the video element of the browser client is modified while retaining the real-time character of the video stream.

* * * * *